(12) United States Patent
Arand

(10) Patent No.: US 6,644,903 B1
(45) Date of Patent: Nov. 11, 2003

(54) CAPTIVE FASTENER WITH GRADIENT HARDENED FERRULE

(75) Inventor: David W. Arand, Loveland, OH (US)

(73) Assignee: Matdan America Corp., Cincinnati, OH (US)

(*) Notice: Subject to any disclaimer, the term of this patent is extended or adjusted under 35 U.S.C. 154(b) by 0 days.

(21) Appl. No.: 10/167,256

(22) Filed: Jun. 11, 2002

Related U.S. Application Data

(60) Provisional application No. 60/297,501, filed on Jun. 12, 2001.

(51) Int. Cl.[7] .................. F16B 21/18; F16B 39/00
(52) U.S. Cl. .................. 411/352; 411/107; 411/353; 411/533; 411/999
(58) Field of Search .................. 411/107, 108, 411/352, 353, 533, 970, 999

(56) References Cited

U.S. PATENT DOCUMENTS

| 3,209,807 A | 10/1965 | Ryner |
| 3,244,212 A | 4/1966 | Barry |
| 3,465,803 A | 9/1969 | Ernest et al. |
| D283,591 S | 4/1986 | Swanstrom |
| 4,681,495 A | 7/1987 | Crespin et al. |
| 4,863,326 A | 9/1989 | Vickers |
| 5,256,019 A | 10/1993 | Phillips, II |
| 5,306,175 A | 4/1994 | Swanstrom |
| 5,338,139 A | 8/1994 | Swanstrom |
| 5,382,124 A | 1/1995 | Frattarola |
| 5,489,176 A | 2/1996 | Fultz |
| 5,544,992 A | 8/1996 | Ciobanu et al. |
| 5,611,654 A | 3/1997 | Frattarola et al. |
| 5,642,972 A | 7/1997 | Ellis et al. |
| D388,316 S | 12/1997 | McDonough et al. |
| D391,844 S | 3/1998 | Ropponen et al. |
| D392,179 S | 3/1998 | Ropponen et al. |
| D400,430 S | 11/1998 | McDonough et al. |
| 5,851,095 A | 12/1998 | Ellis et al. |
| 5,865,582 A | 2/1999 | Ellis et al. |
| 5,910,052 A | 6/1999 | Ellis et al. |
| 5,941,669 A | 8/1999 | Aukzemas |
| 6,033,168 A | 3/2000 | Creely, III et al. |
| 6,079,920 A | 6/2000 | Dispenza |
| 6,079,923 A | 6/2000 | Ross et al. |
| 6,086,480 A | 7/2000 | Ellis et al. |
| D437,209 S | 2/2001 | McDonough et al. |
| 6,238,155 B1 | 5/2001 | Aukzemas et al. |
| 6,309,156 B1 * | 10/2001 | Schneider .......... 411/107 X |
| 6,309,158 B1 * | 10/2001 | Bellinghausen et al. 411/107 X |

* cited by examiner

Primary Examiner—Neill Wilson
(74) Attorney, Agent, or Firm—Wood, Herron & Evans, LLP

(57) ABSTRACT

A captive fastener for press-in installation in panels has a ferrule capable of being crimped to provide a positive engagement with a screw element of the captive fastener. The ferrule has a hardness gradient such that a penetration tip of the ferrule has a hardness greater that exceeds the hardness of the panel, and an upper rim of the ferrule is deformable to limit movement of the ferrule relative to the screw element by interference. Typically, the penetration tip has a hardness greater than about Rockwell B60 to permit the press-in installation to the panel.

26 Claims, 2 Drawing Sheets

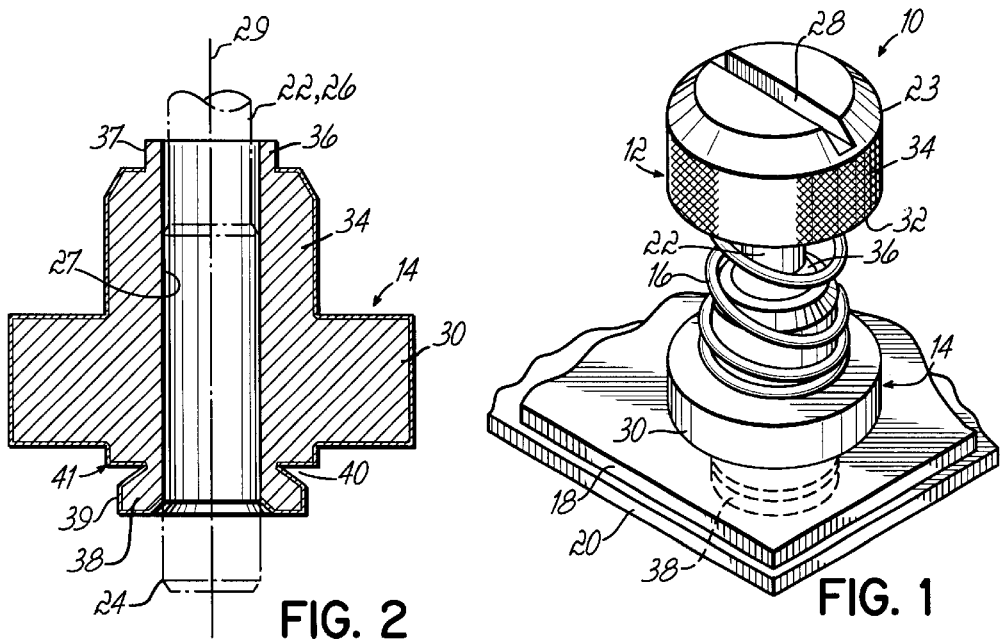
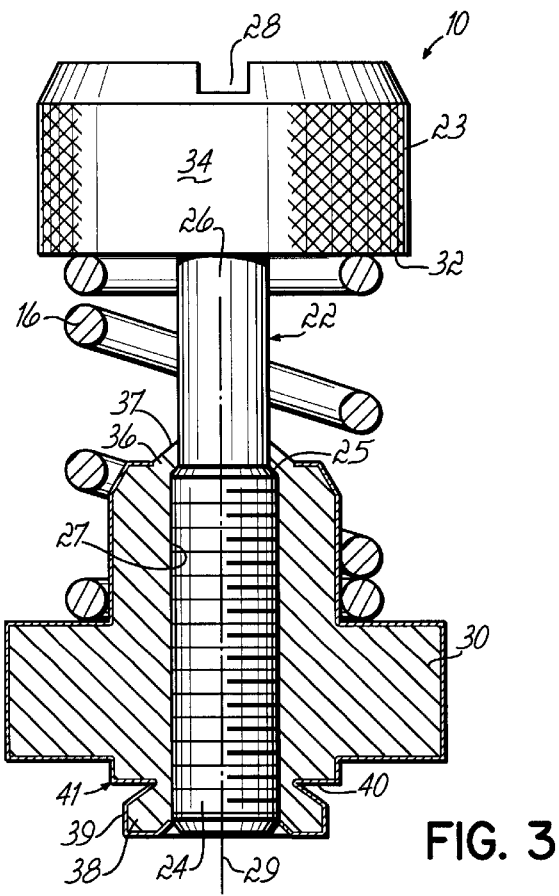

CAPTIVE FASTENER WITH GRADIENT HARDENED FERRULE

This claims the benefit of U.S. Provisional application Serial No. 60/297,501, filed Jun. 12, 2001, and hereby incorporated by reference in its entirety.

FIELD OF THE INVENTION

This invention relates to captive fasteners for press-in installation into panels or the like.

BACKGROUND OF THE INVENTION

Captive fasteners are mechanically attached to a mating component or panel, such as a releasable access panel, a face plate, or an electronic chassis, and are retained to the mating component so as to prevent loss during use. Common captive fasteners include a screw element having a shank with a threaded portion, such as a threaded stud, and an attaching collar referred to as a ferrule assembled with the screw element. When the threaded portion is unfastened from the panel, the ferrule restrains the captive fastener against disengagement from the panel. Captive fasteners ease assembly and speed disassembly without the occurrence of loose fastening components.

One conventional method for attaching the captive fastener to the panel or mating component is to press-in the ferrule into the panel. To that end, the material forming the ferrule must be harder and less malleable than the material forming the panel to achieve a constant flow of panel material around the ferrule's mounting profile during press-in installation. The engagement between the panel material and the ferrule creates an obstruction that positively captivates the ferrule with the panel. Serrations, rings, barbs or protrusions are often added to the ferrule profile to create interference and displace the softer, more malleable panel material. Other conventional methods for achieving a press-in engagement between the ferrule and the panel include a multi-profile design with a flange at the end of the ferrule, a groove located next to the flange at the flanged end of the ferrule, or a protrusion element such as a ring or knurl pressed and embedded into the material of the mating component during installation. In all press-in methods, the ferrule material must be harder than the panel material to allow the panel material to flow to create a reliable and secure engagement between the ferrule and the panel.

One familiar type of press-in captive fastener is assembled by inserting the threaded portion of the shank of the screw element through a bore in the ferrule. Subsequently, a rim or edge of the ferrule is bent down or crimped to close the bore and create a smaller inner diameter around an unthreaded smaller diameter portion of the shank of the screw element. The rim may be located at an upper edge of the ferrule, at a mid-section or higher as long as the rim is fastened above the threads of the fastener to capture the threaded region. This smaller diameter opening in the ferrule prevents the diametrically larger threaded portion of the screw element from passing back through the ferrule so that the ferrule is captured to the screw element.

One major disadvantage with this conventional press-in captive fastener design is that the ferrule must be soft and malleable to allow it to be crimped and bent around the shank of the screw element. The need for a malleable or ductile ferrule places serious restrictions on the use of this type of captive fastener. Specifically, conventional captive fasteners of this type may only be installed into panels or other surfaces that are softer than the ferrule, typically a surface hardness less than about 60 on the Rockwell B scale (Rockwell B60). As a result, conventional press-in fasteners of this design are not usable with panels formed of most popular carbon steels having hardness greater than Rockwell B60.

Therefore, there is a need for a press-in captive fastener for use with panels having a surface hardness greater than that of the panel and in which a portion of the ferrule is captured with the screw element by deformation.

SUMMARY OF THE INVENTION

The invention relates to press-in captive fasteners for use with panels in which a portion of the ferrule is crimpable for capturing the screw element. According to one embodiment of the invention, a captive fastener assembly is provided for press-in installation into an opening formed in a panel. The captive fastener assembly includes a screw element having a head and a shank projecting from the head and a ferrule having a central bore receiving the shank of the screw element. The shank of the screw element includes a threaded portion and an unthreaded portion disposed between the head and the threaded portion. The ferrule has an upper rim deformed radially inward to limit movement of the ferrule relative to the screw element by interference with the threaded portion. The ferrule also has a penetration tip having a surface hardness greater than the upper rim and/or the panel for press-in installation into the opening in the panel.

In accordance with the principles of the invention, the gradient hardening of the ferrule permits the captive fastener to be used in panels formed of a material harder than the upper rim, typically over Rockwell B60 hardness, and still provide a simple and effective way of assembling the ferrule to the screw element. The ability to crimp a portion of the ferrule to couple the screw element with the ferrule simplifies the construction of the captive fastener in that an additional retainer or locking element is not required for coupling the ferrule with the screw element.

The above and other objects and advantages of this invention are made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

FIG. 1 is a perspective view of a captive fastener, according to the principles of the invention, joining two panels;

FIG. 2 is an axial cross-sectional view of the ferrule of the captive fastener of FIG. 1 prior to assembly with the screw element;

FIG. 3 is an axial cross-sectional view of the captive fastener of FIG. 1; and

DETAILED DESCRIPTION

Figure 4:
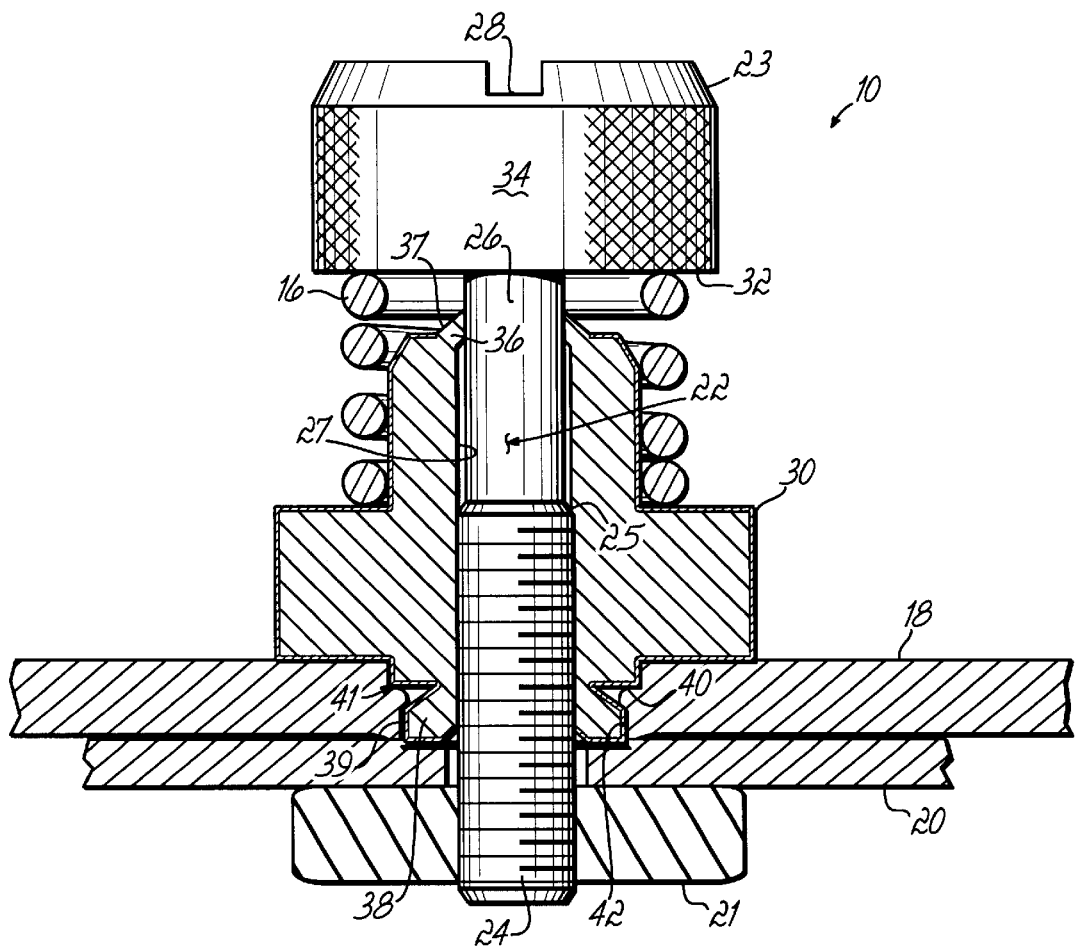
FIG. 4 is a partial cross-sectional view of the captive fastener of FIG. 1, coupling two panels.

With reference to FIGS. 1–4, a captive fastener 10 in accordance with one embodiment of the invention includes a screw element 12, a ferrule 14 interconnected with the screw element 12, and a compression spring 16 biasing the screw element 12 relative to the ferrule 14. The ferrule 14 of the captive fastener 10 is capable of being attached or captivated to an outer panel 18 by a press-in installation and the screw element 12 is utilized to attach the outer panel 18 to an inner panel 20. The outer and inner panels 18, 20 may be formed, for example, from metal sheet including steel and stainless steel panels. The screw element 12 is movable relative to the ferrule 14 between an unfastened condition (FIG. 1) and a fastened condition (FIG. 4) in which the screw element 12 is positioned for coupling the outer panel 18 with the inner panel 20. A fastening structure 21 (FIG. 4) is provided in the form of a threaded nut positioned on an inner side of the inner panel 20 and includes thread pitch complementary to a thread pitch of the screw element 12. The fastening structure 21 may also constitute, for example, a threaded bore (not shown) machined in the inner panel 20.

With reference to FIG. 3, the screw element 12 may include a head 23 at one end and a generally cylindrical shank 22 extending away from the head 23. The shank 22 includes a threaded portion 24 and an unthreaded portion 26 disposed between the head 23 and the threaded portion 24. The threaded portion 26 carries screw threads of a given thread pitch suitable for engaging the screw threads of the fastening structure 21. An outer diameter of the unthreaded portion 26 is smaller than an outer or major diameter of the threads of the threaded portion 24 so as to provide a frusto-conical or other shape shoulder 25 at the boundary where the threaded portion 24 transitions to the unthreaded portion 26.

The head 23 of the screw element 12 includes a drive recess 28, such as a slot, capable of being engaged by a complementary portion of a driving tool or implement (not shown), such as a slotted-type screwdriver (not shown). It is appreciated that the head 23 may be configured with other drive recesses 28 including, but not limited to, TORX®, hex, Phillips, a TORX®/slotted combination, and a Phillips/ slotted combination. The driving tool is used to apply an inwardly directed force toward the outer panel 18 to locate the threads of the fastening structure 21. The driving tool is also used to apply a torque in one rotational direction to advance or tighten the screw element 12 from the fastenable condition to a fastened condition with the fastening structure 21 and a torque in an opposite rotational direction to withdraw or loosen the screw element 12 from the fastened condition to the fastenable condition. In the fastened condition, a length of the threaded portion 24 projects through the outer panel 18 a distance sufficient for engagement with the threads of the fastening structure 21. An outer circumferential surface 34 of the head 23 may be provided with a knurled pattern that promotes a frictional engagement for manual movement of the screw element 12 relative to the ferrule 14 to, for example, locate and provide an initial engagement between the threaded portion 24 and the fastening structure 21.

With continued reference to FIG. 3, the compression spring 16 is helically wound about the screw element 12 and a portion of the ferrule 14. The compression spring 16 is spatially confined between an annular flange 30 projecting outwardly from the ferrule 14 and an annular surface 32 on the underside of the head 23. The annular surface 32 may be recessed within the head 23 as is well known in this art. The compression spring 16 normally biases the screw element 12 relative to the ferrule 14 toward the unfastened condition when the threaded portion 24 is disengaged from the fastening structure 21. When the screw element 12 is advanced to the fastened condition for subsequent engagement with the fastening structure 21, the compression spring 16 is compressed as the head 23 is moved toward the ferrule 14.

The compression spring 16 may be formed of any suitable material, such as a spring steel or a stainless steel. The compression spring 16 provides an ejection force to the screw element 12 to move the screw element 12 from the fastenable condition toward the unfastened condition when the driving tool is detached. The length of the shank 22 may be selected so that no portion of the shank 22 is projected beyond the inwardly facing surface of the outer panel 18 when the screw element 12 is in the unfastened condition. It is appreciated that the compression spring 16 may be removed from the captive fastener 10 without departing from the spirit and scope of the invention.

With reference to FIGS. 2 and 3, the ferrule 14 has a cylindrical central bore 27 extending along its length that is dimensioned diametrically to receive the shank 22 including both the threaded and unthreaded portions 24, 26 of the screw element 12. The screw element 12 is freely rotatable within the central bore 27 relative to the ferrule 14. The ferrule 14 also includes an upper rim 36 of a thinned radial thickness at one end relative to a centerline 29 of the bore 27 and a clinching end or annular penetration tip 38 at an opposite end. In one embodiment, the penetration tip 38 includes a retaining groove 40 adjacent to a shoulder 41.

According to the principles of the invention, the ferrule 14 has a gradient hardness in which at least an outer surface 37 of the upper rim 36 has a first hardness and at least a portion of the penetration tip 38 and specifically, the shoulder 41 has a second hardness greater than the first hardness. The hardness of the upper rim 36 is selected to permit inward deformation for securing the ferrule 14 around the unthreaded portion 26 of the screw element 12. To that end, in one embodiment the material forming upper rim 36 has a hardness less than about 60 on the Rockwell B scale (Rockwell B60) that permits inward deformation of the upper rim 36 for captivating the screw element 12 with the ferrule 14.

As used herein, the terms "gradient hardness," hardness gradient" and variations thereof mean that certain portions of the ferrule 14 have a hardness, surface or otherwise, different from other portions of the ferrule 14 to aid in assembly and installation of the fastener 10.

With reference to FIG. 3, the upper rim 36 is deformed radially inwardly, such as by a crimping process, about the unthreaded portion 26 of the screw element 12 to provide an interference fit with shoulder 25 to positively capture the screw element 12 with the ferrule 14. The inward deformation reduces an inner diameter of at least a portion of the bore 27 inside the upper rim 36 to a lesser diameter than the shoulder 25. As a result, the interference between the upper rim 36 and the shoulder 25 stops the movement of the ferrule 14 in a direction that would allow the ferrule 14 to otherwise become disengaged from the screw element 12. The inward deformation of the upper rim 36 permits the shank 22 of the screw element 12 to move axially in bore 27 relative to the ferrule 14 without separation of the ferrule 14 from the screw element 12.

With reference to FIGS. 2 and 3, at least the shoulder 41 of the penetration tip 38 of the ferrule 14 has a hardness that permits the captive fastener 10 to be installed and retained in outer panel 18 formed of a material having a surface hardness less than the shoulder 41. Specifically, in one embodiment, the shoulder 41 of the ferrule 14 is hardened to greater than Rockwell B60. The specific hardness is selected to be greater than the surface hardness of the material forming the outer panel 18 into which the ferrule 14 is to be push-in installed. For example, the penetration tip 38 and specifically, the shoulder 41, in one embodiment, is hardened to a hardness of at least Rockwell B60 for push-in installation into outer panels 18 having a surface hardness less than Rockwell B60. Typically, the only portion of the ferrule 14 having a hardness less than Rockwell B60 is the material forming upper rim 36. It is appreciated that, although the captive fastener 10 of the invention is particularly suited for press-in installation in outer panel 18 having a hardness less than Rockwell B60, the captive fastener 10 may also be press-in installed into outer panel 18 having a wide range of hardness.

The gradient hardness of the ferrule 14 is provided by locally hardening the material forming the ferrule 14 near penetration tip 38 so that the material forming the ferrule 14 in the region of upper rim 36 remains sufficiently deformable to permit assembly of the ferrule 14 with the screw element 12. One method for providing the localized hardening is to machine the ferrule 14 from a low-carbon steel, such as 12L 14 carbon steel, having a hardness less than Rockwell B60 and to selectively increase the carbon content of the material forming the ferrule 14 near penetration tip 38 by carbo-nitriding in a case hardening process. To that end, the upper rim 36 of ferrule 14 is covered by a thin layer of a barrier material, such as a thin layer of copper plating, that blocks carbon diffusion during the carbo-nitriding. The case hardening process diffuses carbon radially inwardly into the outer surface of the penetration tip 38 to a depth such that the material forming the outer surface of the penetration tip 38 and specifically, the shoulder 41 is hardened to a surface hardness exceeding Rockwell B60. Carbon cannot diffuse into the material forming the upper rim 36 because of the obstruction provided by the barrier layer and, as a result, the hardness of the material forming the upper rim 36 is unchanged by the carbo-nitriding process. Generally, the depth of the case hardening is about 0.010 inches and the thickness of the barrier material ranges from about 0.008 inches to about 0.010 inches. The invention contemplates other conventional methods apparent to a person of ordinary skill for selectively supplying carbon to the area of the penetration tip 38. Moreover, the regions of the ferrule 14 other than the penetration tip 38 may be case hardened, with the exception of the upper rim 36, and/or regions of the ferrule 14 other than the upper rim 36, except for the penetration tip 38, may be covered with a barrier material in certain embodiments of this invention.

Various alternative surface and/or through methods are available for providing the hardening gradient of the invention. One alternative method for providing the localized hardening is to selectively apply heat with a heat treatment to raise the temperature of the outer surface of the penetration tip 38 above the critical temperature of the material forming the ferrule 14 so as to increase the surface hardness locally to greater than that of the panel 18. Another alternative method is to form the ferrule 14 from two components, in which one component carries penetration tip 38 having a surface hardness greater than the panel 18 and a second component carries upper rim 36 having a lesser surface hardness capable of being crimped, and to braze or weld the two components together. Yet another alternative method for providing the localized or gradient hardness is to selectively apply a surface treatment to the penetration tip 38 that has a surface hardness greater than the panel 18 that can be selectively hardened to a surface hardness greater than the panel 18 without the process also hardening the upper rim 36. Another alternative method for providing the localized hardness is to heat treat or carbo-nitride the entire ferrule 14 and remove the surface treated thickness from the upper rim 36. Further still, hardening may be achieved through furnace treatment, resistance, induction, and other techniques. The primary objective is to obtain a shoulder 41 that is harder than upper rim 36 and panel 18.

In use and with reference to FIG. 4, a slightly-undersized aperture or opening 42, relative to the diameter of the penetration tip 38, is punched or drilled in the outer panel 18. The opening 42 is registered with a corresponding threaded opening in the inner panel 20 or with a smooth-bored hole in the inner panel 20 for nut-assisted attachment. An installation tool (not shown), such as a press, is used to provide an installation force to drive or press the penetration tip 38 of the ferrule 14 into the opening 42. A back-up tool or an anvil (not shown) is positioned on the opposite side of the outer panel 18 from the back-up tool to provide structural support to the portion of the outer panel 18 surrounding opening 42 during the press-in installation and typically includes a clearance hole aligned with the opening 42. A typical installation force ranges from about 500 pounds to about 5000 pounds. As the penetration tip 38 moves into the outer panel 18, the shoulder 41 having a diameter slightly greater than that of the opening 42 is driven by the installation force. When the shoulder 41 contacts the panel 18, the material of outer panel 18, surrounding the opening 42, being softer and/or more malleable than the shoulder 41, cold flows inwardly into the retaining groove 40 and around the tip 38 for positively captivating the ferrule 14 with the outer panel 18. The positive captivation between panel material and the retaining groove 40 panel secures the captive fastener 10 with the outer panel 18 and prevents detachment of the captive fastener 10 from the outer panel 18 when the screw element 12 is in the unfastened condition.

Typically, the push-out force needed to detach the captive fastener 10, when ferrule 14 is properly installed with the outer panel 18, exceeds about 50 pounds and may be as great as several hundred pounds. The screw element 12 is then selectively moved inwardly to the fastenable condition for locating and engaging the fastening structure 21. The fastened condition is provided by the application of torque to the drive recess 28 that advances the screw element 12 relative to the fastening structure 21 for coupling the outer panel 18 mechanically with the inner panel 20.

While the invention has been illustrated by the description of the embodiment thereof, and while the embodiment has been described in considerable detail, it is not the intention of the applicant to restrict or in any way limit the scope of the appended claims to such detail. Additional advantages and modifications will readily appear to those skilled in the art. For example and without limitation, the screw element may be a bolt or other form of mechanical fastener element and the ferrule may achieve a hardness gradient of any appropriate quantity or by any of the methods/techniques described herein or others now known or hereafter developed. Therefore, the invention in its broader aspects is not limited to the specific details, representative apparatus and/or methods disclosed herein. Accordingly, departures may be made from such details without departure from the spirit or scope of applicant's general inventive concept.

What is claimed is:

1. A captive fastener assembly adapted for press-in installation into an opening formed in a panel, comprising:

a fastener element having a head and a shank projecting from the head, the shank including a shoulder spaced from the head; and a ferrule having a central bore receiving the shank of the fastener element;

a first portion of the ferrule of a first hardness being deformed radially inward intermediate the head and the shoulder of the fastener element to limit movement of the ferrule relative to the fastener element by interference with the shoulder and the head; and a second portion of the ferrule of a second hardness greater than the first hardness;

wherein the second portion is adapted for press-in installation into the opening in the panel to retain the captive fastener to the panel.

2. The captive fastener assembly of claim 1 wherein the first portion of the ferrule further comprises:

an upper rim at a first end of the ferrule.

3. The captive fastener assembly of claim 1 wherein the second portion of the ferrule further comprises:

a penetration tip proximate an end of the ferrule opposite the head of the fastener element.

4. The captive fastener assembly of claim 1 wherein the fastener element further comprises a screw element.

5. The captive fastener assembly of claim 1 wherein the second portion has a hardness greater than about Rockwell B60.

6. The captive fastener assembly of claim 1 wherein the shank further comprises:

a threaded portion spaced from the head; and an unthreaded portion disposed between the head and the threaded portion;

wherein the shoulder is at a juncture between the threaded and unthreaded portions of the shank.

7. The captive fastener assembly of claim 1 wherein the first hardness of the first portion of the ferrule is less than about Rockwell B60.

8. The captive fastener assembly of claim 3 wherein the penetration tip further comprises:

a shoulder; and a retainer groove adjacent to the shoulder of the ferrule adapted to receive a cold-flow of a material forming the panel.

9. The captive fastener assembly of claim 1 further comprising:

a compression spring captured between the head of the fastener element and the ferrule to bias the fastener element relative to the ferrule.

10. The captive fastener assembly of claim 1 wherein the fastener element is movable relative to the ferrule between an unfastened condition and a fastened condition.

11. The captive fastener assembly of claim 1 wherein the second portion of the ferrule has a surface hardness greater than a surface hardness of the panel.

12. The captive fastener assembly of claim 1 further comprising:

a drive recess on the head of the fastener element.

13. A captive fastener assembly adapted for press-in installation into an opening formed in a panel, comprising:

a screw element having a head and a shank projecting from the head;

a threaded portion of the shank being spaced from the head;

an unthreaded portion of the shank disposed between the head and the threaded portion;

a shoulder at a juncture between the threaded and unthreaded portions of the shank;

a ferrule having a central bore receiving the shank of the screw element;

an upper rim of a first hardness at a first end of the ferrule, the upper rim being deformed radially inward intermediate the head and the shoulder of the screw element to limit movement of the ferrule relative to the screw element by interference with the shoulder and the head;

a penetration tip at an end of the ferrule opposite the upper rim of the ferrule, at least a portion of the penetration tip being of a second hardness greater than the first hardness of the upper rim;

wherein the penetration tip is adapted for press-in installation into the opening in the panel to retain the captive fastener to the panel.

14. The captive fastener assembly of claim 13 wherein the penetration tip has a hardness greater than about Rockwell B60.

15. The captive fastener assembly of claim 13 wherein a surface hardness of the upper rim of the ferrule is less than about Rockwell B60.

16. The captive fastener assembly of claim 1 further comprising:

a compression spring captured between the head of the screw element and the ferrule to bias the screw element relative to the ferrule.

17. The captive fastener assembly of claim 13 wherein at least a portion of the penetration tip of the ferrule has a hardness greater than a surface hardness of the panel.

18. A captive fastener assembly adapted for press-in installation into an opening formed in a panel, comprising:

a screw element having a head and a shank projecting from the head;

a drive recess on the head of the screw element;

a threaded portion of the shank being spaced from the head;

an unthreaded portion of the shank disposed between the head and the threaded portion;

a first shoulder at a juncture between the threaded and unthreaded portions of the shank;

a ferrule having a central bore receiving the shank of the screw element;

a compression spring captured between the head of the screw element and the ferrule to bias the screw element relative to the ferrule;

an upper rim of a first hardness at a first end of the ferrule, the upper rim being deformed radially inward intermediate the head and the shoulder of the screw element to limit movement of the ferrule relative to the screw element by interference with the shoulder and the head;

a second shoulder proximate an end of the ferrule opposite the upper rim of the ferrule, the second shoulder being of a second hardness greater than the first hardness of the upper rim;

wherein the second hardness of the second shoulder is greater than a hardness of the panel and is adapted for press-in installation into the opening in the panel to retain the captive fastener to the panel; and a retainer groove adjacent to the shoulder of the ferrule adapted to receive a cold-flow of a material forming the panel.

19. A combination comprising:

a panel having an opening formed therein;

a captive fastener assembly coupled to the panel at the opening, the captive fastener further comprising:

(a) a screw element having a head and a shank projecting from the head;

(b) a threaded portion of the shank being spaced from the head;

(c) an unthreaded portion of the shank disposed between the head and the threaded portion;

(d) a shoulder at a juncture between the threaded and unthreaded portions of the shank;

(e) a ferrule having a central bore receiving the shank of the screw element;

(f) an upper rim of a first hardness at a first end of the ferrule, the upper rim being deformed radially inward intermediate the head and the shoulder of the screw element to limit movement of the ferrule relative to the screw element by interference with the shoulder and the head;

(g) a penetration tip at an end of the ferrule opposite the upper rim of the ferrule, at least a portion of the penetration tip being of a second hardness greater than the first hardness of the upper rim;

wherein the penetration tip is press-in coupled to the panel to retain the captive fastener to the panel.

20. The combination of claim 19 further comprising:

a compression spring captured between the head of the screw element and the ferrule to bias the screw element relative to the ferrule.

21. The combination of claim 19 wherein the penetration tip of the ferrule has a surface hardness greater than a surface hardness of the panel.

22. A method of making a captive fastener for press-in installation into an opening formed in a panel, comprising:

forming a ferrule having a central bore, a penetration tip adjacent to one end of the central bore, and an upper rim adjacent to an opposite end of the central bore;

inducing a hardness gradient in the ferrule such that at least a portion of the penetration tip has a hardness greater than a hardness of the upper rim;

inserting a screw element into the central bore of the ferrule; and deforming the upper rim to provide a positive engagement between the ferrule and the screw element so that the ferrule retains the screw element within the central bore.

23. The method of claim 22 wherein the inducing of the hardness gradient further comprises:

masking the upper rim with a layer of a barrier material that blocks carbon diffusion; and diffusing carbon into the ferrule by a carbo-nitriding process to provide a case hardening.

24. The method of claim 22 wherein the inducing of the hardness gradient further comprises:

selectively applying heat to elevate a temperature of the penetration tip above the critical temperature of the material forming the ferrule.

25. The method of claim 22 wherein the inducing of the hardness gradient further comprises:

forming a first component of the ferrule carrying the penetration tip that has a first hardness;

forming a second component of the ferrule carrying the upper rim that has a second hardness less than the first hardness; and joining the first and second components together to form the ferrule.

26. The method of claim 22 wherein the inducing of the hardness gradient further comprises:

treating the ferrule by one of heat treating and carbo-nitriding to provide a surface treated thickness having a hardness greater than the material of the ferrule; and removing the surface treated thickness from the upper rim.

* * * * *